S. J. McGINNIS.
COMBINED FEED TROUGH AND RACK.
APPLICATION FILED OCT. 23, 1906.

985,047.

Patented Feb. 21, 1911.
2 SHEETS—SHEET 1.

Inventor:
S. J. McGinnis,

By Saul Bagger & Co.
Attorneys

Witnesses
Helen T. McKeever
Wm. Bagger

S. J. McGINNIS.
COMBINED FEED TROUGH AND RACK.
APPLICATION FILED OCT. 23, 1906.

985,047.

Patented Feb. 21, 1911.

2 SHEETS—SHEET 2.

WITNESSES:

INVENTOR:
S. J. McGINNIS,
By Louis Bagger & Co
ATTORNEYS.

UNITED STATES PATENT OFFICE.

SIMON J. McGINNIS, OF KNOXVILLE, IOWA.

COMBINED FEED-TROUGH AND RACK.

985,047. Specification of Letters Patent. Patented Feb. 21, 1911.

Application filed October 23, 1906. Serial No. 340,241.

*To all whom it may concern:*

Be it known that I, SIMON J. McGINNIS, a citizen of the United States, residing at Knoxville, in the county of Marion and State of Iowa, have invented certain new and useful Improvements in Combined Feed-Troughs and Racks, of which the following is a specification.

This invention relates to combined feed troughs and racks adapted to contain food for fattening stock in such a manner as to be readily accessible to the stock at all times.

The invention has particular reference to that class of feed troughs and racks in which a trough is combined with a superimposed hopper or receptacle in which grain, ground feed or the like may be stored and from whence it passes by gravity into the trough; the same being also combined with a rack whereby the animals that are feeding are separated from each other.

The present invention has for its object to simplify and improve the construction and operation of this class of devices.

A further object is to so construct and arrange the parts as to enable the device to be readily dismembered for the purpose of cleaning the same.

A further object of the invention is to construct the improved device with a watering trough at one end thereof.

With these and other ends in view, which will readily appear as the invention is better understood, the same consists in the improved construction and novel arrangement and combination of parts which will be hereinafter fully described and particularly pointed out in the claims.

In the accompanying drawings there has been illustrated a simple and preferred form of the invention; it being, however, understood that no limitation is necessarily made to the precise structural details therein exhibited, but that changes, alterations and modifications within the scope of the invention may be resorted to when desired.

Figures 1, 5:
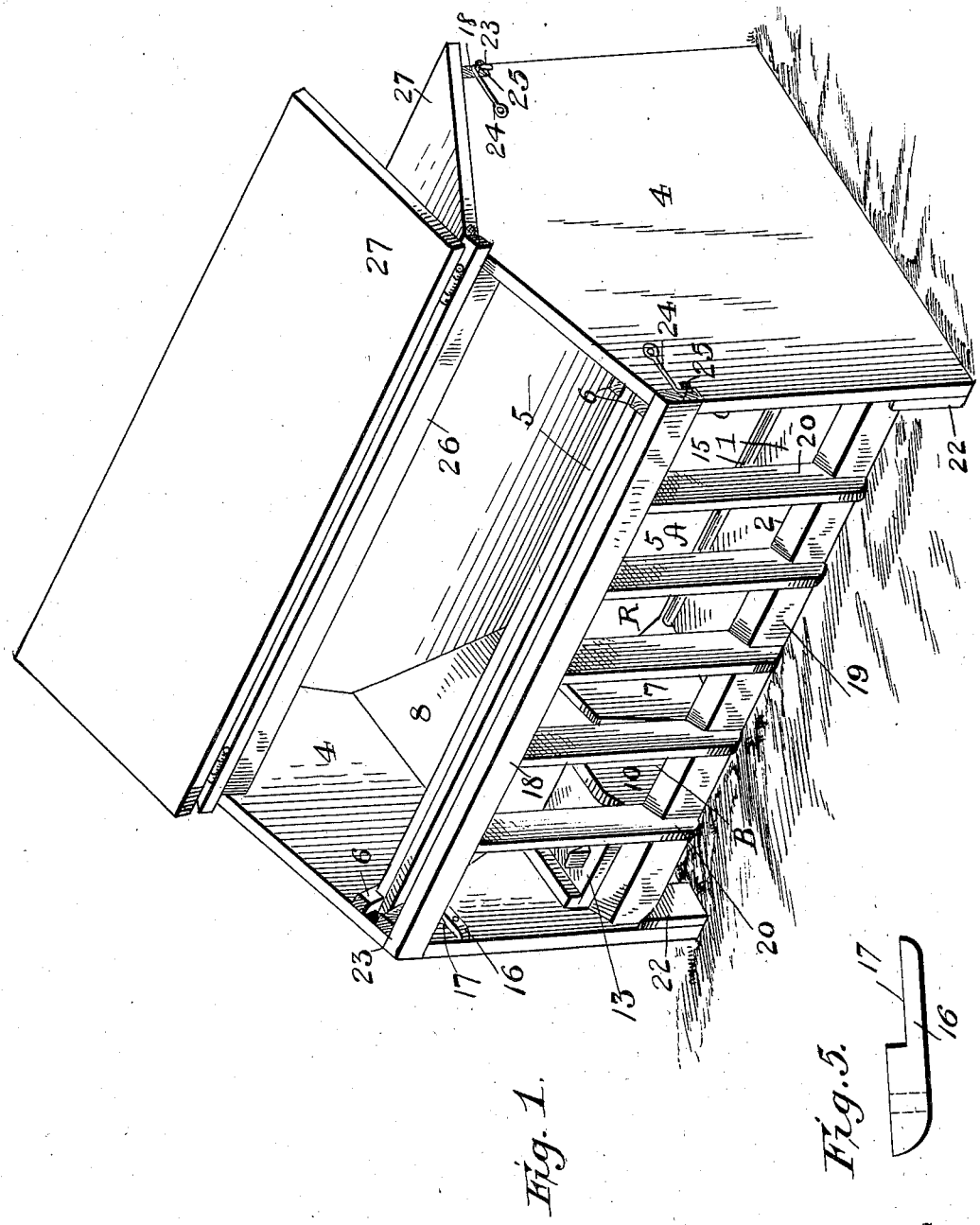
Figure 2:
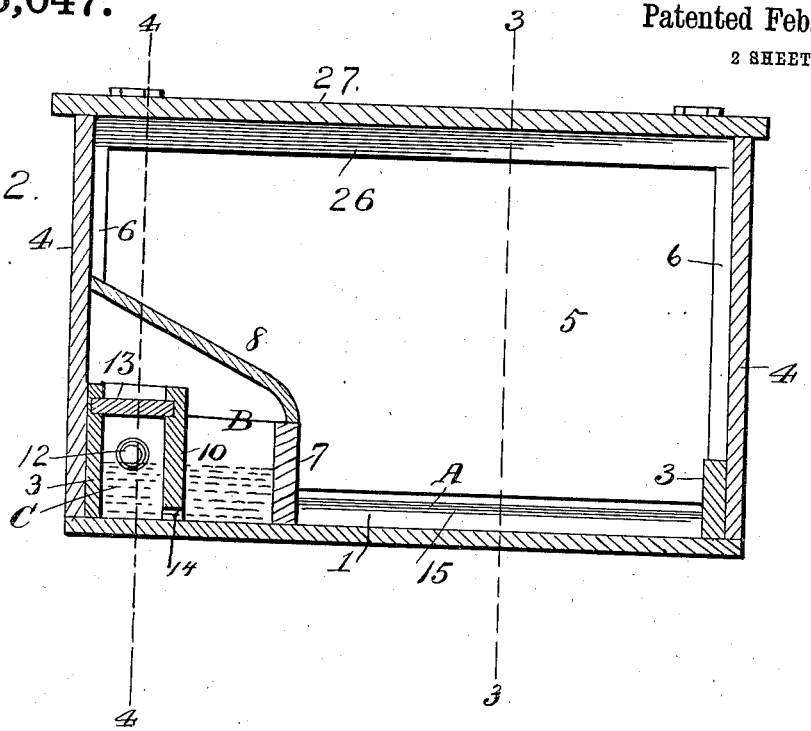
Figure 3:
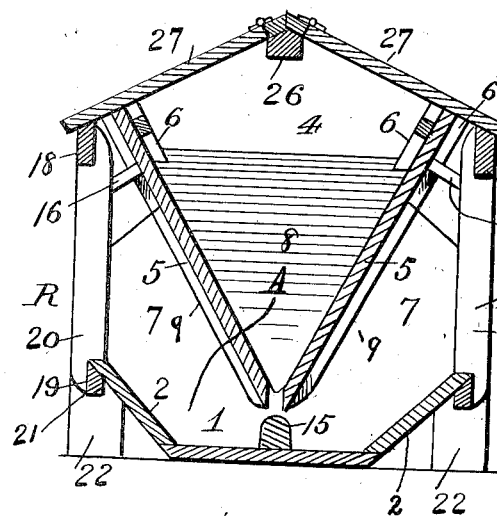
Figure 4:
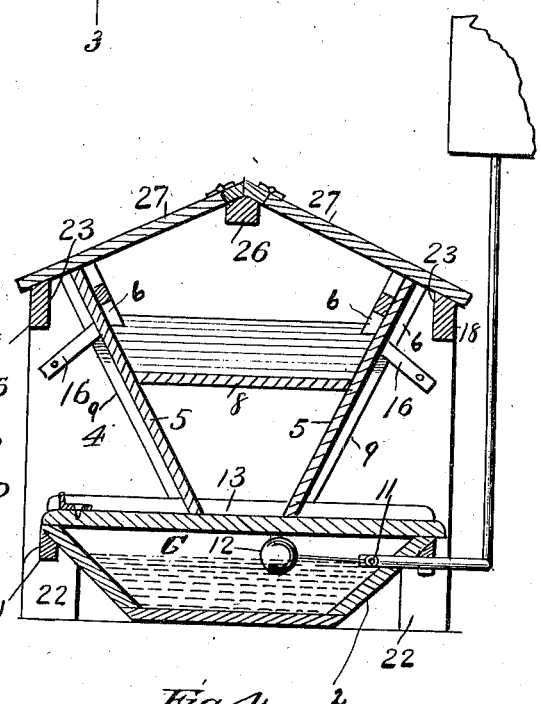

In the drawings—Figure 1 is a perspective view of a combined trough and rack constructed in accordance with the principles of the invention, the lid at the near side being thrown open. Fig. 2 is a longitudinal sectional view of the device. Fig. 3 is a vertical transverse sectional view taken on the plane indicated by the line 3—3 in Fig. 2. Fig. 4 is a vertical transverse sectional view taken on the plane indicated by the line 4—4 Fig. 2. Fig. 5 is a detached view of one of the turn-buttons 16.

Corresponding parts of the several figures are denoted by like characters of references.

1 designates a trough of suitable dimensions having flaring outwardly divergent sides 2, 2, and vertical end pieces 3, 3. The end pieces 3, 3, are secured upon the inner sides of the end walls 4, 4, which latter constitute the ends of a hopper or receptacle, the side members of which 5, 5, are supported slidably and adjustably by means of guide cleats 6, 6, that are secured in pairs upon the inner sides of the end walls 4, 4.

The trough 1 is provided with a transverse partition 7, which is connected with one of the end walls 4 by an inclined bottom member 8; the partition 7 is provided with supporting cleats 9 for the side members 5 of the hopper. The partition 7 divides the trough 1 into two separate compartments, namely, a feed compartment A, and a water compartment B. The latter is provided with sub-partition 10, which separates the main compartment B from an inlet compartment C, wherein is located an inlet pipe 11, which is suitably connected with a source of water supply, such as a tank or barrel, and which is provided with suitably constructed automatic valve which is shown as provided with a float 12, whereby the admission of water is automatically regulated.

The inlet compartment C is provided with a sliding cover 13, whereby the inlet valve is protected; and said sub-compartment communicates with the compartment B through an aperture 14 in the partition 10, whereby the water in the compartment B is maintained at the proper level. It will be seen by this simple construction the water in the compartment B is at all times accessible to the stock, while the valve in the inlet compartment C is protected from meddling by the stock.

The feed compartment A of the trough 1, is provided with a central longitudinal rib or ridge 15, coinciding with the lower edges of the slidable side members 5, 5, of the hopper. The contents of the hopper, which gravitates into the trough beneath the lower edges of the side members 5, will be guided over the rib 15 into the direction of the outsides of the trough where it will be readily reached by the feeding stock. In this manner the escape of the contents of the hopper is greatly facilitated, and it will be in no danger of becoming choked as would be the case if the rib 15 were dispensed with and the side members 5 were extended toward the bottom of the trough.

The side members 5, 5, of the hopper are fitted to slide freely in the separate cleats, so that they may be readily adjusted for the purpose of gaging the distance between the lower edges of the said members and the rib 15, according to the nature of the feed that is placed in the hopper; said side members may be secured at various adjustments by means of cams or eccentrics which are in the nature of turn-buttons 16 pivoted upon the end walls 4, and adapted to bear exteriorly upon the side members 5, said turn buttons being provided with notches 17 to clear the cleats 6.

The improved device is provided at the sides thereof with suitably constructed racks R, composed of longitudinal top and bottom bars 18, 19, connected and framed together by vertical cross pieces 20. The terminal ends of the bottom bars 19 are fitted in notches 21, in the upper edges of blocks 22, which are secured upon the end walls 4 adjacent to the ends of the trough; the terminal ends of the top bars 18 are fitted in notches 23 in the upper corners of the end walls 4, where they are held detachably by means of hooks 24, engaging headed studs 25 at the ends of said top bars 18. By this construction the racks, which serve to separate the feeding animals and to prevent them from interfering with each other, may be very readily detached, when desired, in order to afford access to the trough for the purpose of cleaning the same; the side members of the hopper may likewise be readily removed, when desired.

The end walls 4, 4, of the device are connected with each other by means of a ridge member or pole 26 with which are hingedly connected lids 27 that are adapted to close against the upper edge of the end walls 4 and the side members 5 of the hopper, for which a weather-tight closure is thus provided.

The operation and advantages of this invention will be readily understood from the foregoing description taken in connection with the drawings hereto annexed.

The construction of the improved trough and rack is simple and inexpensive; it may be made in a great variety of sizes; it being equally adapted to the needs of hogs, sheep and cattle, as well as poultry. It may be utilized for the purpose of feeding grain as well as ground feed, which will gravitate from the hopper or container into the trough as fast as it is removed from the latter by the feeding animals; and it may also be advantageously used for the purpose of feeding slop which, by pouring it into the hopper, will pass into the trough without being thrown over the heads of the feeding animals as is oftentimes the case where slop is fed in an open trough.

The side members 5, 5, of the hopper or receptacle are readily adjustable so that fine or coarse material may be fed, the same being permitted to pass from the hopper into the trough more or less freely as may be desired.

A very important advantage of the present device resides in the facility with which it may be dismembered for the purpose of cleaning the same; every corner of the trough being accessible and there being no lurking places for microbes and fermenting material.

Having thus described the invention, I claim:

1. A feed trough comprising a bottom, inclined sides connected to the bottom, end walls connected to the bottom and sides thereby forming a receptacle, a partition dividing the receptacle into two compartments, a rigid inclined way leading from one end wall to the partition thus forming a partial covering for one of the compartments, and a covered hopper, adapted to empty its contents into the uncovered compartment, mounted above the receptacle, said hopper consisting of adjustable sides operating between cleats formed on the end walls, and means for holding the sides in their adjustable position.

2. A feed trough comprising a receptacle having a longitudinal central rib, end walls secured to the receptacle a partition dividing the receptacle into two compartments which are accessible from either side, a rigid inclined way leading from one of the end walls to the partition thereby covering a part of one of the compartments, means for supplying water to the partially covered receptacle, a removable hopper mounted above the receptacle and adapted to empty its contents into the uncovered compartment.

3. A feed trough, end walls secured upon the trough, having recesses at the upper ends thereof, inclined side members supported adjustably upon the end walls, and combining with the latter to form an adjustable hopper or receptacle, notched blocks secured upon the end walls adjacent to the walls of the trough, racks having longitudinal bottom bars engaging the notches in the blocks, said bars being of such a construction as to form a locking means against outward movement at the bottom of said rack when in a vertical position, and longitudinal top bars engaging recesses at the upper corners of the end walls, headed studs in the end of said top bars, hooks pivoted upon the end walls, and lids hinged upon the rigid pole.

In testimony whereof I have signed my name to this specification in the presence of two subscribing witnesses.

SIMON J. McGINNIS.

Witnesses:
W. C. JACOB,
FRANK BURT.